Figure 2:
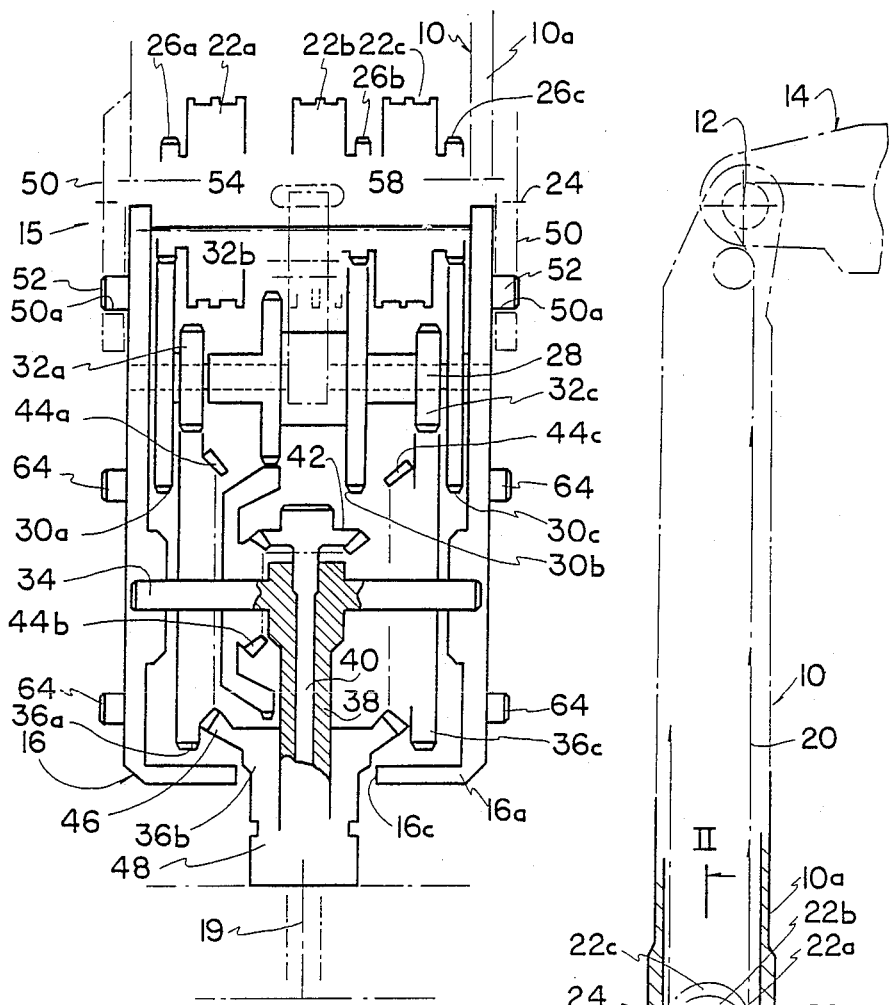

United States Patent [19]

Teillauchet et al.

[11] Patent Number: 4,873,885
[45] Date of Patent: Oct. 17, 1989

[54] DEVICE FOR THE DISCONNECTABLE COUPLING OF A TOGGLE JOINT TO A TELEMANIPULATOR SLAVE ARM

[75] Inventors: Eric Teillauchet; Angelo Bandiera, both of Vendome, France

[73] Assignee: Societe Nouvelle D'Exploitation La Calhene, Velizy-Villacoublay, France

[21] Appl. No.: 192,198

[22] Filed: May 10, 1988

[30] Foreign Application Priority Data

May 20, 1987 [FR] France .................... 87 07068

[51] Int. Cl.⁴ ................ B25J 3/00; G05G 1/04
[52] U.S. Cl. .................... 74/520; 74/527; 901/29; 901/31; 901/41; 403/322; 403/330; 414/1; 414/729
[58] Field of Search ............ 74/520, 527, 522.5; 901/29, 27, 28, 41, 31; 403/322, 321, 330; 414/1, 729

[56] References Cited

U.S. PATENT DOCUMENTS

| | | | |
|---|---|---|---|
| 4,225,283 | 9/1980 | Baker et al. | 74/520 |
| 4,515,029 | 5/1985 | Reynolds et al. | 74/520 |
| 4,597,689 | 7/1986 | Mitchell et al. | 403/322 |
| 4,621,854 | 11/1986 | Boley et al. | 901/31 X |
| 4,650,388 | 3/1987 | Frioux et al. | 901/31 X |
| 4,723,457 | 2/1988 | Zinck et al. | 74/520 X |

FOREIGN PATENT DOCUMENTS

| | | | |
|---|---|---|---|
| 659517 | 2/1965 | Belgium | 403/322 |
| 0104118 | 3/1984 | European Pat. Off. | 901/31 |
| 2142410 | 3/1972 | Fed. Rep. of Germany | 403/322 |
| 0015053 | 1/1987 | Japan | 901/29 |
| 1355483 | 11/1987 | U.S.S.R. | 901/31 |

Primary Examiner—Vinh Luong
Attorney, Agent, or Firm—Pearne, Gordon, McCoy & Granger

[57] ABSTRACT

The open end of the shaft (10) of the slave arm of a telemanipulator carries two fixed hooks (50) able to encircle two spindles (52) projecting on either side of a toggle joint (16) supporting a gripper (18). Hooks (50) and spindles (52) form a pivot axis, which is displaced from the side of the pivot pin (34) of the gripper with respect to a plane parallel to the pivot axix and containing the longitudinal axis of shaft (10a). On the side of the plane opposite to the hooks (50) and the spindles (52), a latch (54) locks the case (16a) to the end of the shaft, thus, formed coupling device (15).

6 Claims, 4 Drawing Sheets

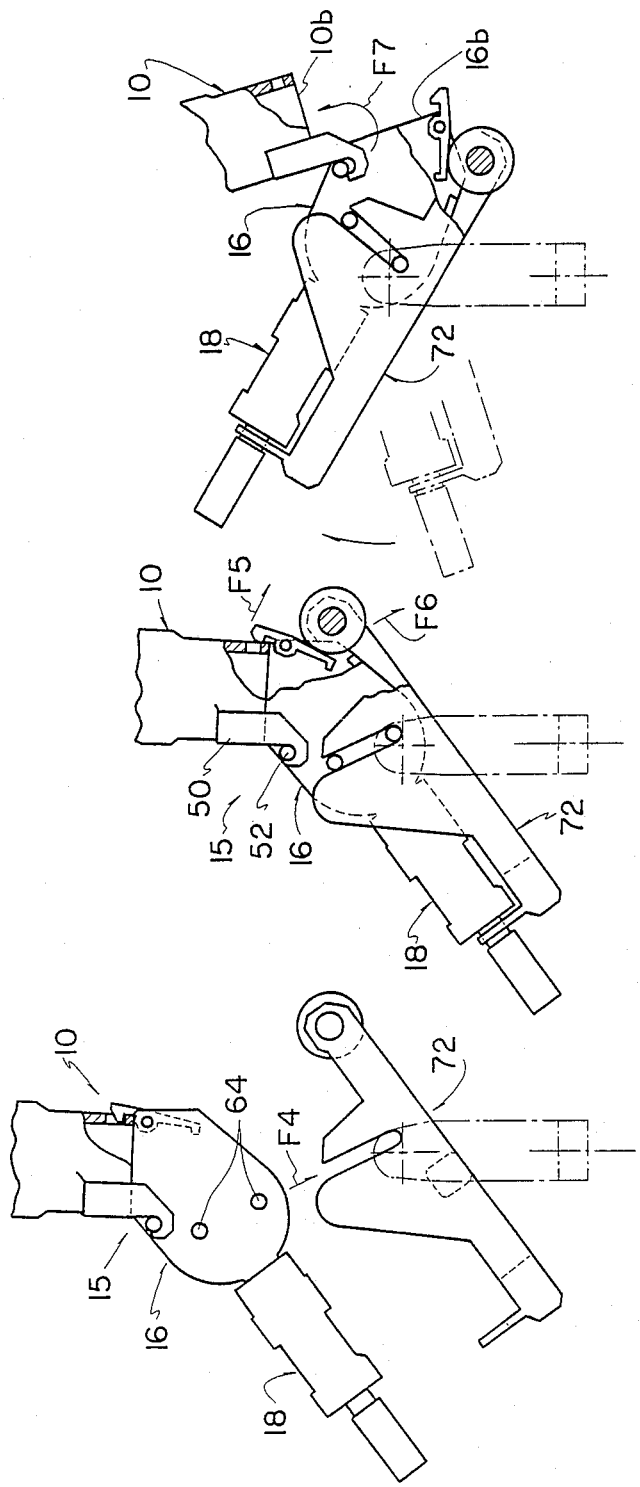

DEVICE FOR THE DISCONNECTABLE COUPLING OF A TOGGLE JOINT TO A TELEMANIPULATOR SLAVE ARM

DESCRIPTION

The invention relates to a device making it possible to disconnectably couple a toggle joint carrying a gripper to the end of a slave arm of a telemanipulator.

FR-A-No. 2 533 159 which has an equivalent U.S. Pat. No. 4,650,388 issued on Mar. 17, 1987 to Frioux et al. describes a disconnectable coupling device having two tilting latches mounted at the end of the slave arm and whose pivoting enables them to encircle two fingers or pawls fixed in accordance with a common axis on either side of the box or case of the toggle joint. When the toggle joint is connected to the arm, driving and driven gears or pinions respectively mounted at the end of the arm and in the toggle joint mesh with one another in order to transmit orientation and clamping movements to the gripper.

In the said known coupling device, the latches simultaneously fulfil the function of maintaining the toggle joint at the end of the slave arm and the function of locking between said two parts. Thus, the weight of the toggle joint and the gripper which it supports is transmitted to the slave arm through said tilting latches. Thus, there is necessarily a certain functional clearance between the slave arm and the toggle joint in the median plane of the arm containing the latches and the fingers. In view of the fact that it is also in said median joint that the meshing takes place between the driving and driven gears, the functional clearance integrally occurs between said driving and driven gears. There is consequently a significant risk of premature wear occurring to the gears during the operation of the telemanipulator.

Moreover, as the tilting latches both maintain and lock the toggle joint, an accidental dropping of the latter may occur in the case of a fracture of the springs locking the latches in the locking position.

Finally, for bringing about the connection and disconnection of the toggle joint, it is necessary to pivot the tilting latches in two opposite directions. Consequently the disconnection station on which the toggle joint and its gripper have been placed must be equipped with a locking and unlocking mechanism able to occupy two positions as a function of the operation to be performed. Therefore this disconnection station is relatively complicated and costly.

The present invention relates to a disconnectable coupling device in which the holding and locking functions are separate, the holding function being assured by fixed members between which the clearance can be very small and which are positioned in such a way that the toggle joint is automatically engaged against the end of the slave arm under the effect of the overhang for most orientations of the gripper, so that it is possible to reduce the clearance existing between the driving and driven pinions, so as to render virtually impossible the automatic detachment of the toggle joint and so as to simplify the disconnection station.

According to the invention this result is achieved by means of a device for the disconnectable coupling of a toggle joint to a telemanipulator slave arm, the latter having a shaft with a longitudinal axis and an open end in which are mounted driving gears whose axis is perpendicular to said longitudinal axis, and the toggle joint having a case supporting driven gears about a transverse axis adjacent to an opening of the case and a gripper support rod having an axis orthogonal to said transverse axis mounted in the case by a pivot pin parallel to said transverse axis, the coupling device connecting the case to the shaft in such a way that the opening of the case is adjacent to the open end of the shaft, the pairwise meshed driving and driven gears with their parallel oriented axes are located in a plane containing the longitudinal axis of the arm and the pivot pin of the gripper support rod located on one side of said plane, said device being characterized in that it comprises:

at least one spindle fixed to the toggle joint case in accordance with an axis parallel to the pivot pin of the gripper support rod and located on the same side as said pivot pin with respect to said plane beyond said opening;

at least one rigid hook fixed to the shaft and projecting beyond its open end so as to encircle said spindle under the effect of a relative pivoting between the toggle joint and the end of the arm about the axis of the spindle; and means for locking the case to the end of the shaft located on the opposite side with respect to said plane.

In this device, the spindles and hooks are fixed members holding the toggle joint carrying the gripper at the end of the slave arm. The clearance between these members can consequently be significantly reduced compared with the clearance existing between the latches and the fingers in FR-A-No. 2 533 159.

Moreover, when the gripper is forwardly oriented, i.e. on the same side as the plane containing the axes of the driving and driven gears as the pivot pin, which corresponds to the most widespread working conditions, the toggle joint, the gripper and the load which the latter may support tend to pivot about the spindles under the effect of the overhang in the sense corresponding to the engagement of the toggle joint against the end of the slave arm. The clearance existing between the driving and driven gears is then approximately equal to half the already very small clearance existing between the hooks and the spindles. Therefore the wear undergone by the gears as a result of this clearance is virtually non-existent.

In the much rarer case where the gripper is rearwardly oriented the toggle joint, gripper and the possible load tend to rotate in the reverse direction about the spindles. The maximum clearance is then determined by the locking means and approximately corresponds to that existing in FR-A-No. 2 533 159 between the tilting latches and the fingers. However, this clearance is here still divided approximately by two to the right of the driving and driven gears, so that even under the least favourable conditions, the risks of wear to the gears are less than in the device described in FR-A-No. 2 533 159.

In a preferred embodiment of the invention, the locking means incorporate a latch articulated to the case about an axis parallel to the pivot pin of the gripper support rod, said latch having a projecting curved end able to penetrate a recess formed at the end of the shaft under the action of elastic means.

Preferably the device according to the invention comprises two spindles projecting in accordance with a common axis on either side of the case and two hooks fixed to the shaft in order to in each case encircle the said spindles.

According to another aspect of the invention, each of the hooks is turned from the side opposite to said plane and defines an approximately semicircular slot able to encircle part of the spindle opposite to said opening.

In an embodiment of the invention permitting the automatic connection and disconnection of the toggle joint, the case has members for positioning the latter in an orientable cradle of a disconnection station. This orientable cradle preferably comprises an abutment automatically disengaging the curved end of the latch from said recess in opposition to elastic means, when the positioning members are placed in the cradle.

Figure 1:
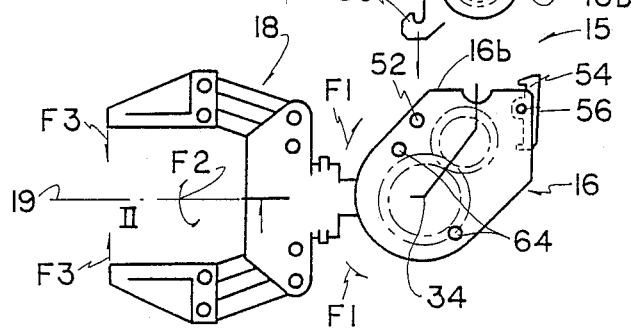

A preferred embodiment of the invention will be described in greater detail hereinafter and in non-limitative manner with reference to the attached drawings, wherein show:

FIG. 1 A side view very diagrammatically showing the end of the slave arm of an articulated remote manipulator or telemanipulator and the gripper—toggle joint assembly fixed to the end of said slave arm by means of the disconnectable coupling device according to the invention.

FIG. 2 A longitudinal sectional view along line II—II of FIG. 1, representing on a larger scale the end of the slave arm, as well as the toggle joint.

Figure 3:
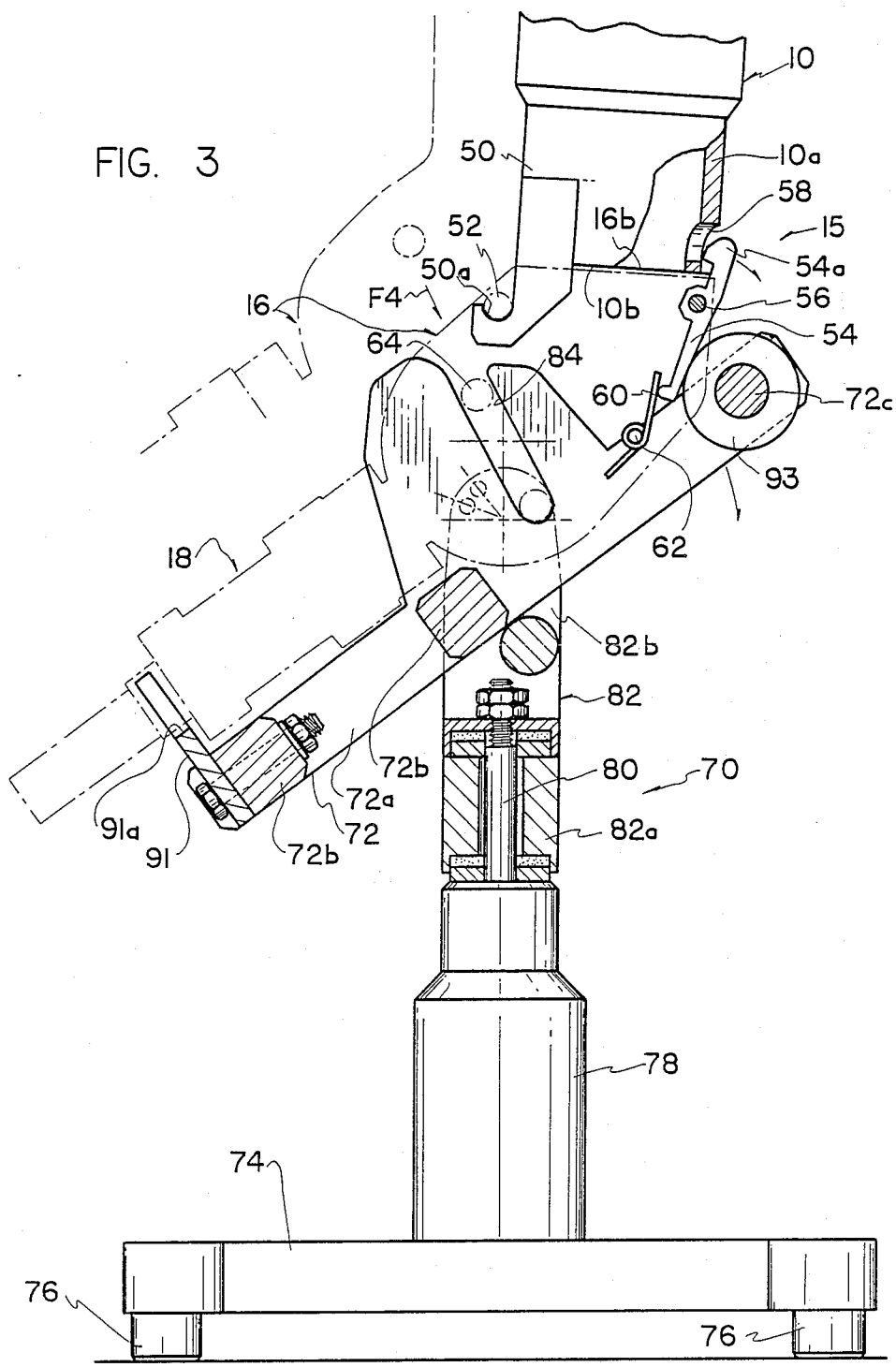

FIG. 3 A diagrammatic side view showing in partial section and on a larger scale the end of the slave arm and the gripper—toggle joint assembly during the putting into place of said assembly on an appropriate disconnection station.

Figure 4:
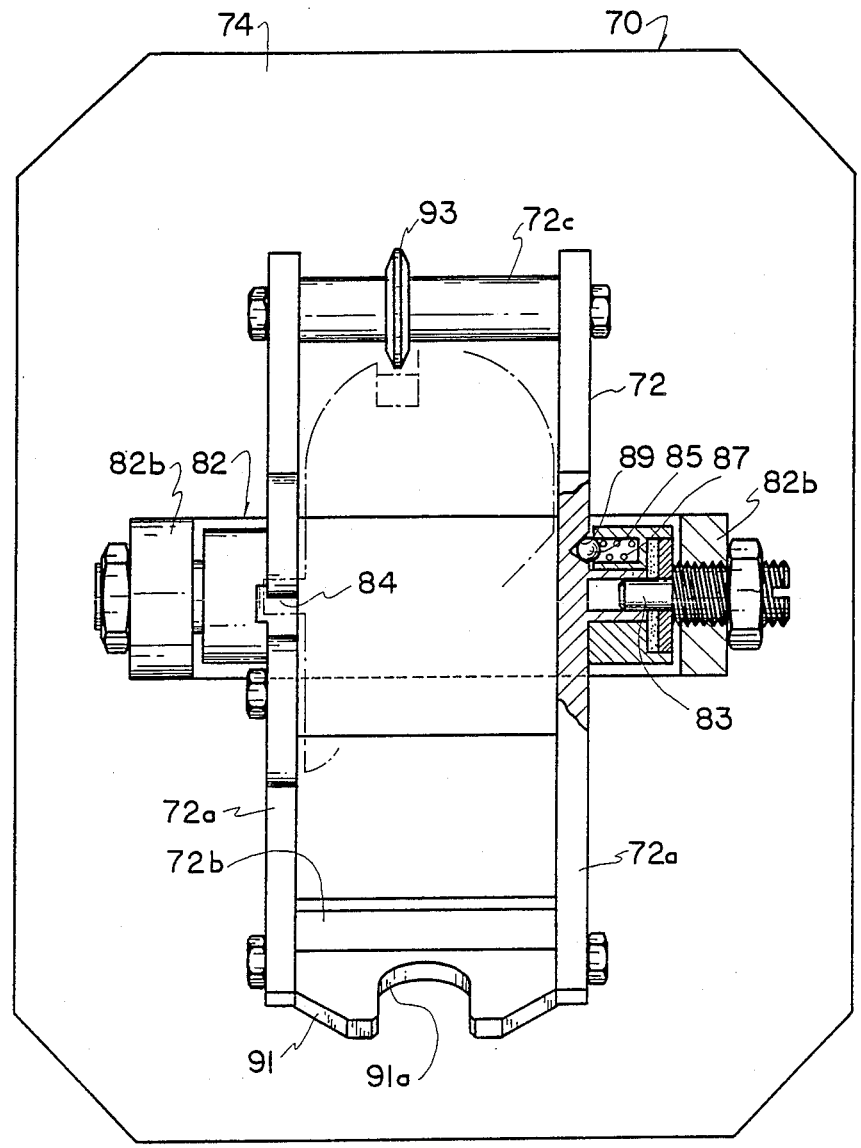

FIG. 4 A view from below in part section showing the cradle of the disconnection station of FIG. 3.

FIGS. 5a to 5c Side views diagrammatically showing different stages of the putting into place of the gripper—toggle joint assembly on the disconnection station and then the disconnection of said assembly with respect to the end of the slave arm.

FIG. 1 very diagrammatically shows the front segment 10 of the slave arm of an articulated telemanipulator. This front segment 10 is articulated by an angle pin 12 to a rear segment 14, which is itself articulated by a shoulder pin to a support block mounted within a not shown cell.

According to the invention, a disconnectable coupling device 15 makes it possible to remotely fit and remove a toggle joint 16 with respect to the free end of slave arm 10. Toggle joint 16 supports an articulated gripper 18, which can be of any known type. This gripper 18 can either be permanently mounted on the toggle joint 16, or can be detachably fixed to the latter by any appropriate known means.

As will be shown in greater detail hereinafter, the toggle joint 16 makes it possible to pivot the gripper 18 about a pivot pin 34 orthogonal to the longitudinal axis of arm 10 (arrows F1 in FIG. 1) and to rotate the gripper 18 about its own axis 19 (arrow F2 in FIG. 1). Moreover, gripper 18 is able to perform a clamping movement (arrow F3 in FIG. 1).

As is very diagrammatically illustrated in FIG. 1, the transmission within the slave arm of three movements F1, F2 and F3 generally takes place by means of belts 20, whereof the ends located within the support block are fixed to not shown capstans controlled by motors sensitive to signals from the master arm.

At the free end of segment 10, each of the belts 20 is wound on to a pulley. More specifically, when three movements are transmitted to the gripper as indicated hereinbefore, three pairs of belts 20 are located within the slave arm, each movement being transmitted by means of two identical belts. These three pairs of belts 20 are wound on to three double pulleys 22a, 22b and 22c at the lower end of the slave arm.

As illustrated in greater detail in FIG. 2, the three double pulleys 22a, 22b and 22c are mounted in such a way as to be able to freely rotate on a common pin 24 traversing the shaft 10a of segment 10 perpendicular to its axis and in immediate proximity to the edge 10b of the open end of shaft 10a (FIG. 1). Each of the pulleys 22a, 22b and 22c is fixed to a driving gear 26a, 26b, 26c respectively. In the represented embodiment, the driving gears all have the same diameter.

The means making it possible to transmit to gripper 18 the movements from pulleys 22a to 22c will now be described with reference to FIG. 2. Toggle joint 16 comprises a box or case 16a having an opening, whose edge 16b can be applied to the edge 10b of the open end of segment 10 (FIG. 1). A pin 28 is mounted in case 16a in the vicinity of edge 16b of the opening, said pin 28 being oriented parallel to pin 24 and in a plane containing the longitudinal axis of segment 10, when the edges 10b and 16b are maintained in contact by the device 15 according to the invention. Pin 28 supports in rotary manner three identical driven gears 30a, 30b and 30c, which mesh respectively on driving gears 26a, 26b and 26c when the toggle joint is fixed to the arm. Each of the driven gears 30a, 30b and 30c is integral with a second gear 32a, 32b and 32c.

The toggle joint case 16a also supports in rotary manner the pivot pin 34 of the gripper, said pin being arranged parallel to pin 28 and is disposed at a given distance from one side of the plane containing pins 24 and 28 and the longitudinal axis of segment 10, when the toggle joint is connected to the end of said segment. On the pivot pin 34 are rotatably mounted three gears 36a, 36b and 36c, which respectively mesh on gears 32a, 32b, 32c.

A tubular part 38 is fixed to the centre of pin 34, in such a way that its axis 19 is perpendicular to pin 34. The tubular part 38 projects through a circular arc slit 16c formed in the toggle gear case 16a substantially opposite to edge 16b. Part 38 supports in rotary manner a shaft 40. A bevel gear 42 is integral with the end of shaft 40 located within the toggle gear case. Said gear 42 meshes on the bevel gear 44b integral with gear 36b.

Moreover, gears 36a and 36c are identical and arranged symmetrically on either side of the common axis to shaft 40 and tubular part 38. Moreover, these gears are respectively integral with a bevel gear 44a and a bevel gear 44c, said two gears being identical and facing one another. Bevel gears 44a, 44c mesh on a bevel gear 46 integral with a tubular end piece 48 mounted in rotary manner on tubular part 38.

Rotary shaft 40, tubular part 38 and tubular end fitting 48 are arranged coaxially along axis 19 and all three have a part projecting out of the toggle joint case 16a through the circular arc slit 16c. Thus, they constitute a support rod on which is fixed the gripper 18 by any dismantlable or non-dismantlable known means as stated hereinbefore.

For the satisfactory understanding of the invention, it is pointed out that the body of gripper 18 is fixed to the tubular end fitting 48 and that the rotary shaft 40 drives the mechanism within the gripper ensuring the clamping and unclamping of its jaws (arrow F3 in FIG. 1).

When the assembly constituted by gripper 18 and toggle joint 16 is connected to the end of arm 10 with the aid of device 15 according to the invention, the orientation movements F1, F2 and the clamping movement F3 of gripper 18 are transmitted by belts 20 to the toggle joint and gripper via mechanisms which will now be described.

When the belts 20 wound on to pulleys 22a and 22c are simultaneously actuated in the same direction and at the same speed, the bevel gears 44a and 44c are themselves rotated in the same direction and at the same speed via kinematic chains formed on the one hand by gears 26a, 30a, 32a and 36a and on the other hand by gears 26c, 30c, 32c and 36c. As the bevel gears 44a, 44c are meshed on gear 46 at diametrically opposite points of the latter, the latter does not turn about its own axis and instead the rod formed by shaft 40, part 38 and endpiece 48, as well as the gripper supported by said rod are pivoted about pivot pin 34. Thus, movement F1 in FIG. 1 is obtained.

However, when the belts 20 passing over pulleys 22a and 22c are driven in the reverse direction and at the same speed, the kinematic chains of the aforementioned gears lead to a rotary movement in the reverse direction and at the same speed of bevel gears 44a and 44c. In this case, gear 46 is rotated about its own axis, as is the endpiece 48 integral therewith and the gripper 18 mounted on said endpiece. The pivoting movements of gripper 18 about its own axis, designated F2 in FIG. 1, is consequently obtained.

Finally, when the belt 20 wound on to the central pulley 22b moves, said pulley rotates the bevel gear 44b, via the kinematic chain formed by gears 26b, 30b, 32 and 36b. As gear 44b is meshed on gear 42 integral with shaft 40, the latter is rotated about its own axis. Therefore the clamping movement F3 of the gripper is obtained.

Obviously, in practice, these different movements are generally combined.

The disconnectable coupling device 15 which, according to the invention, makes it possible to fix the toggle joint 16 to the open end of the slave arm shaft 10a, will now be described with reference to FIGS. 2 and 3.

At the open end of the slave arm, said coupling device comprises two rigid hooks 50 fixed to the shaft 10a outside the same, so as to project beyond its open end. Each of the hooks 50 is in the form of an approximately flat metal plate disposed in a plane perpendicular to axis 24 and on either side of shaft 10a. As can be better seen in FIG. 3, the ends of hooks 50 projecting beyond the open end of the shaft are bent outwards and upwards, considering FIG. 3, in order to form approximately semicircular slots 50a, whose common axis is parallel to axis 24. These alots 50a are tangential to the external envelope of the end of the shaft 10a and are located outside said envelope. Therefore these slots 50a are displaced with respect to the plane passing through the longitudinal axis of the shaft and through axes 24 and 28 of the gears, on the same side as the pivot pin 34 of the toggle joint, when the latter is mounted at the end of the slave arm.

The disconnectable coupling device 15 according to the invention also comprises two spindles 52 fixed on either side of the toggle joint case 16a in accordance with a common axis parallel to pins or axes 28 and 34, in the vicinity of edge 16b of the opening formed in case 16a. The diameter of spindles 52 is approximately equal to that of the slots 50a of the hooks. Moreover, the two spindles 52 are located at a point such that each of them is placed in the slot 50a of one of the hooks 50 when the toggle joint is connected to the end of the slave arm. The two spindles 52 are consequently displaced on the same side as the pivot pin 34 with respect to the plane containing axes 24 and 28, as well as the longitudinal axis of segment 10, the distance separating the axis of said spindles from said plane being equal to the distance separating the geometrical axes of the semicircular slots 50a from said same plane. Moreover, the distance separating the axis of spindles 52 from the plane containing the edge 10b of the open end of segment 10 is equal to the distance separating the axis of the slots 50a from the plane containing the edge 16b of the opening of the toggle joint case 16a.

The assembly formed by hooks 50 and spindles 52 consequently makes it possible to rigidly maintain the toggle joint at the end of the slave arm with relatively narrow tolerances, because each of the parts is fixed.

Moreover, the connection formed in this way between the toggle joint 16 and the end of the slave arm is a connection pivoting about the spindles 52, which are located on the side of the toggle joint towards which the gripper 18 is oriented under most working conditions. The centre of gravity of the gripper—toggle joint—load assembly is therefore generally displaced with respect to the thus formed pivoting axis, so as to pivot the toggle joint about said axis in a counterclockwise direction considering FIG. 3. The edge 16b of the opening formed on the case of the toggle joint is therefore naturally engaged against the edge 10b of the open end of shaft 10a.

However, it is necessary to use a means for locking the toggle joint to the end of the slave arm when the gripper is tilted to the maximum in the counterclockwise direction on considering FIG. 3. Thus, the gripper—toggle joint—load assembly then tends to pivot in the reverse direction about spindles 50.

According to the invention, the disconnectable coupling device 15 also comprises locking means which, in the embodiment shown, are constituted by a latch 54 mounted in pivoting manner in the toggle joint case 16a about a pin 56 parallel to pins 28 and 34. This latch 54 is located on the other side of the plane passing through the shaft axis and through the axes 24 and 28 with respect to spindles 52. Latch 54 is approximately parallel to the axis of the shaft in a notch formed for this purpose in the toggle joint case 16a, in the vicinity of the edge 16b of the opening formed in said case. Beyond edge 16b, latch 54 has an end 54a curved towards the interior of the opening. When the edge 10b of the open end of shaft 10a bears on said edge 16b of the opening of case 16a, the curved end 54a of latch 54 penetrates a recess 58 formed for this purpose in shaft 10a in the vicinity of its open end.

A spring 60, such as a torsion spring mounted on a pin 62 parallel to pins 28 and 34 within the toggle joint case bears on the opposite end of latch 54 in order to pivot the latter about its own axis, so as to automatically bring its curved end 54a into recess 58.

Under the most common manipulating conditions for which the gripper 18 is oriented in the manner illustrated in FIG. 3 with a maximum upward or downward travel of approximately 30°, the distribution of the masses with respect to the pivot axis constituted by spindles 52 received in hooks 50 tends to pivot the toggle joint—gripper assembly in counterclockwise direction considering FIG. 3. As the clearance between spindles 52 and hooks 50 can be very greatly reduced because said parts are fixed, the clearance between the driven gears 26a to 26c and driving gears 30a to 30c, which is approximately equal to half said already small clearance is consequently negligible. Under the standard use conditions of the telemanipulator, the coupling device according to the invention consequently ensures optimum meshing conditions between the two sets of gears. Therefore wear to the gears is reduced to a minimum.

Under the least favourable and rarer conditions for which the gripper 18 is inclined to the maximum in a counterclockwise direction considering FIG. 3, the gripper—toggle joint assembly pivots in the reverse direction about the axis formed by spindles 52. The largest clearance is then formed between the curved end 54a of latch 54 and recess 58, which receives said curved end. However, in view of the outwardly displaced arrangement of the latch 54 with respect to the plane containing pins 24 and 28 of the driving gears 26a to 26c and driven gears 30a to 30c, the clearance existing between these gears is substantially equal to half that existing between latch 54 and recess 58. Therefore a relatively small clearance is also guaranteed under these conditions, in such a way that wear to the gears is very significantly reduced compared with existing coupling devices.

FIGS. 3 and 4 also shows a disconnection station 70 designed to automatically ensure the connection and disconnection of a gripper—toggle joint assembly with respect to the end of a slave arm with the aid of the coupling device 15 described hereinbefore.

In order to permit its automatic positioning on the disconnection station, the toggle joint case 16a then has positioning members on its two opposite faces carrying spindles 52. These positioning members are constituted by two pairs of pins 64, whose axes are oriented parallel to axes 28 and 34 and are disposed in a plane passing approximately through the pivot pin 34 and on either side of the latter. The plane containing pins 64 defines the direction of introducing toggle joint 16 on to an orientable cradle 72 of station 70 (arrow F4 in FIG. 3).

More specifically, the disconnection station 70 comprises a base 74 resting by feet 76 on an appropriate flat surface provided for this purpose within the cell. A column 78 projects vertically upwards from the horizontal base 74. At its upper end, column 78 carries a vertical pivot 80 supporting in rotary manner the mounting base 82a of a U-shaped member 82, whereof the two arms 82b project vertically upwards.

As illustrated in FIG. 4, at their upper ends the arms 82b pivotably support the cradle 72 about a horizontal axis. This axis is materialized by two pivots 83 fixed to the ends of arms 82b. Balls 85 are applied by springs 87 to cradle 72, in order to maintain the latter in two preferred orientations, respectively disconnection and connection, when the balls penetrate paper holes 89 formed for this purpose on cradle 72.

Cradle 72 has two identical flanks 72a, on which are formed the holes 89 and which are connected by spacers 72b and by an eccentric 72c to one end. The spacer 72b located at the opposite end supports a plate 91 having a notch 91a able to receive gripper 18. Eccentric 72c carries a roller 93 constituting an abutment, which bears against the end of the latch 54 opposite to the curved end 54a, in order to disengage the latter from recess 58 when the toggle joint is placed on the cradle.

On referring to FIG. 3, it can be seen that each of the flanks 72a of cradle 72 has a slit 84 in which are received the pins 64 projecting on the opposite flanks of the toggle joint case.

When an operator wishes to disconnect a gripper—toggle joint assembly fixed to the slave arm of a telemanipulator with the aid of the device according to the invention, he orients the cradle 72 in the manner shown in FIG. 5a marked by the penetration of balls 85 in the two cradle holes 89. With the gripper in its median position, as illustrated in FIG. 5a, the pins 64 are introduced into the cradle slits 84 by moving the gripper—toggle joint assembly in the direction of arrow F4 in FIG. 5a.

When this introduction is ended (FIG. 5b), the curved end of latch 54 is disengaged from recess 58 by roller 93. The operator then manipulates the ends of the slave arm rearwards and downwards (arrow F5), so as to pivot the orientable cradle 72 by approximately 60° into the position shown in FIG. 5c (arrow F6 in FIG. 5). During this movement, there is a relative pivoting between toggle joint 16 and the end of the slave arm about the axis formed between spindles 52 and hooks 50. The disconnection position of cradle 72 is marked by the penetration of balls 85 into two other holes 89. In this position, the edges 10b and 16b form between them an angle of approximately 90°, so that the hooks 50 can be disengaged from the spindles 52, as illustrated by arrow F7 in FIG. 5c.

However, when an operator wishes to fix a gripper—toggle joint assembly to the end of the slave arm of a remote manipulator, he performs the operations described hereinbefore in the reverse order.

More specifically, with cradle 72 remaining in the position of FIG. 5c, the operator places the hooks 50 on spindles 52 and then upwardly moves the end of the telemanipulator in order to tilt the orientable cradle 72 into the position of FIG. 5b.

By then performing an upward movement of the end of the telemanipulator slave arm parallel to the direction then defined by slits 84, he disengages the gripper—toggle joint assembly from the cradle. This movement is accompanied by a release of latch 54, which is then automatically brought into its locking position by spring 60 (FIG. 3).

Apart from the advantages referred to hereinbefore, the description of the disconnection station which has just been given, together with the use thereof shows that this station is particularly simple and that it requires no prior operation, because the orientable cradle is automatically placed in the appropriate position at the end of each connection or disconnection or disconnection operation.

Obviously, certain modifications can be made to the embodiment just described. Thus, latch 54 can be replaced by any other known locking member fulfilling the same function. The two spindles 52 and the two hooks 50 can also be replaced by a single spindle and a single hook, the said two members then having a greater width.

We claim:

1. Device for the disconnectable coupling of a toggle joint (16) to a telemanipulator slave arm (10, 14), said arm having a shaft (10a) with a longitudinal axis and an open end in which are mounted driving gears (26a, 26b, 26c) whose axis is perpendicular to said longitudinal axis (24), and the toggle joint (16) having a case (16a) supporting driven gears (30a, 30b, 30c) about a transverse axis (28) adjacent to an opening of the case and a gripper support rod (38, 40, 48) having an axis orthogonal to said transverse axis mounted in the case (16a) by a pivot pin (34) parallel to said transverse axis (28), the coupling device (15) connecting the case (16a) to the shaft (10a) in such a way that the opening of the case is adjacent to the open end of the shaft, the pairwise meshed driving and driven gears with their parallel oriented axes are located in a plane containing the longitudinal axis of the arm and the pivot pin of the gripper support rod located on one side of said plane, wherein said device (15) comprises:

- at least one spindle (52) fixed to the toggle joint case (16a) in accordance with an axis parallel to the pivot pin (34) of the gripper support rod and located on the same side as said pivot pin with respect to said plane beyond said opening;
- at least one rigid hook (50) fixed to the shaft (10a) and projecting beyond its open end so as to partially surround said spindle (52) under the effect of a relative pivoting between the toggle joint (16) and the end of the arm about the axis of the spindle; and
- means (54, 58, 60) for locking the case (16a) to the end of the shaft (10a) located on the opposite side with respect to said plane.

2. Device according to claim 1, wherein the locking means incorporate a latch (54) articulated to the case (16a) about a pin (56) parallel to the pivot pin (34) of the gripper support rod, said latch having a projecting curved end (54a) able to penetrate a recess (58) formed at the end of shaft (10a) under the action of elastic means (60).

3. Device according to claim 1, wherein it comprises two spindles (52) projecting in accordance with a common axis on either side of case (16a) and two hooks (50) fixed to shaft (10a) in order to encircle each of the said spindles.

4. Device according to claim 1, wherein each hook (50) is turned from the opposite side to said plane and defines a slot (50a), which is approximately semicircular and encircles part of the spindle (52) opposite to said opening.

5. Device according to claim 2, wherein the case (16a) of toggle joint (16) has members (64) for positioning the latter in an orientable cradle (72) of a disconnection station (70).

6. Device according to claim 5, wherein the orientable cradle (72) comprises an abutment (93) automatically disengaging the curved latch end (54a) from said recess (58) in opposition to elastic means (60), when the positioning members (64) are placed in the cradle.

* * * * *

UNITED STATES PATENT AND TRADEMARK OFFICE
CERTIFICATE OF CORRECTION

PATENT NO. : 4,873,885
DATED : October 17, 1989
INVENTOR(S) : Teillauchet et al.

It is certified that error appears in the above-identified patent and that said Letters Patent is hereby corrected as shown below:

In the Abstract, line 1, delete "(10)" and insert --(10a)--.

line 7, delete "the" and insert --said--.

line 7, delete "axix" and insert --axis--.

lines 10 and 11, delete "case (16a) to the end of the shaft, thus, formed coupling device (15)." and insert --thus formed coupling device (15).--.

Column 5, line 53, delete "alots" and insert --slots--.

Signed and Sealed this

First Day of January, 1991

Attest:

HARRY F. MANBECK, JR.

*Attesting Officer*  *Commissioner of Patents and Trademarks*